United States Patent [19]
George et al.

[11] Patent Number: 5,066,701
[45] Date of Patent: Nov. 19, 1991

[54] STABILIZED POLYKETONE POLYMERS

[75] Inventors: Eric R. George; Lynn H. Slaugh, both of Houston, Tex.

[73] Assignee: Shell Oil Company, Houston, Tex.

[21] Appl. No.: 610,286

[22] Filed: Oct. 31, 1990

[51] Int. Cl.$^5$ ............................ C08K 3/32; C08K 3/10
[52] U.S. Cl. ..................................... 524/417; 524/434
[58] Field of Search ................................ 524/417, 434

[56] References Cited

U.S. PATENT DOCUMENTS

| | | | |
|---|---|---|---|
| 2,493,597 | 1/1950 | Rothrock, Jr. et al. | 260/45.7 |
| 2,495,286 | 1/1950 | Brubaker | 260/63 |
| 3,694,412 | 9/1972 | Nozaki | 260/63 |
| 3,948,850 | 4/1976 | Hudgin | 524/417 |
| 4,746,686 | 5/1988 | Waller | 524/417 |
| 4,843,144 | 6/1989 | Van Broekhoven et al. | 528/392 |
| 4,880,903 | 11/1989 | Van Broekhoven et al. | 528/392 |
| 4,937,279 | 6/1990 | Betso et al. | 524/417 |

FOREIGN PATENT DOCUMENTS 57-109848 11/1980 Japan .
1081304 4/1967 United Kingdom .

Primary Examiner—Kriellion S. Morgan
Attorney, Agent, or Firm—Denise Y. Wolfs

[57] ABSTRACT

Polymer compositions comprising an intimate mixture of a linear alternating polymer of carbon monoxide and at least one ethylenically unsaturated hydrocarbon and a mixture of a hydroxyapatite and a zinc aluminate demonstrate improved stability.

22 Claims, No Drawings

STABILIZED POLYKETONE POLYMERS

FIELD OF THE INVENTION

This invention relates to polyketone polymers, and, more particularly, to compositions of a polyketone polymer stabilized with a mixture calcium hydroxyapatite and zinc aluminate.

BACKGROUND OF THE INVENTION

The class of polymers of carbon monoxide and olefins has been known for some time. U.S. Pat. No. 2,495,286 (Brubaker) discloses such polymers of relatively low carbon monoxide content in the presence of free radical initiators, e.g., peroxy compounds. G.B. 1,081,304 discloses similar polymers of higher carbon monoxide content in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorus.

The resulting polymers are relatively high molecular weight materials having established utility as premium thermoplastics in the production of shaped articles, such as containers for food and drink and parts for the automotive industry, which are produced by processing the polyketone polymer according to well known methods.

SUMMARY OF THE INVENTION

The present invention provides certain stabilized polymeric compositions of linear alternating polymers of carbon monoxide and at least one ethylenically unsaturated hydrocarbon, and a process for the production of such stabilized compositions. The compositions are stabilized with a mixture of hydroxyapatite and zinc aluminate. The hydroxyapatite is of the formula $M_{10}(PO_4)_6(OH)_2$, where M is barium (Ba), strontium (Sr), or calcium (Ca). The zinc aluminate is of the formula $ZnO.Al(OH)_3$ or $ZnO.Al_2O_3$. More particularly, the invention provides compositions comprising the linear alternating polymer having a stabilizing mixture of calcium hydroxyapatite and zinc aluminate incorporated therein. The resulting compositions demonstrate improved stability upon being subjected to melt processing conditions.

DESCRIPTION OF THE INVENTION

It is an object of this invention to stabilize the polyketone polymers such that their properties do not deteriorate during melt processing, or upon exposure to other conditions which would otherwise bring about a change in their properties. This object is realized by adding a stabilizing mixture to the polyketone polymer. The stabilized compositions of the invention comprise an intimate mixture of the linear alternating polyketone polymer with a stabilizing mixture of a hydroxyapatite and a zinc aluminate.

The polyketone polymers of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the $-CO-(-CH_2CH_2-)-$ units and the $-CO-(-G-)-$ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

During melt processing, the neat polyketone polymer exhibits an undesirable viscosity increase. It is most desirable for a thermoplastic polymer to have little or no viscosity increase during processing. Most commercial-grade engineering thermoplastics exhibit little or no change in viscosity during melt processing because of the presence of an additive package selected to minimize such a change in properties. For example, U.S. Pat. No. 2,493,597 identifies organic esters of phosphorous acid as melt viscosity stabilizers for polyamides. The polyketone polymers of the subject invention are stabilized with a mixture of a hydroxyapatite and a zinc aluminate.

The hydroxyapatite component of the stabilizing mixture is of the formula $M_{10}(PO_4)_6(OH)_2$, where M is barium (Ba), strontium (Sr), or calcium (Ca). The preferred hydroxyapatite is calcium hydroxyapatite, $Ca_{10}(PO_4)_6(OH)_2$, a naturally occurring calcium phosphate and the major constituent of bone and tooth mineral. It is a finely divided, crystalline, non-stoichiometric material rich in surface ions which are readily replaced by fluoride ions. Calcium hydroxyapatite is also referred to as tribasic calcium phosphate.

The zinc aluminate component of the stabilizing mixture is a chemical combination of zinc, aluminum and oxygen that is illustratively produced by coprecipitation of zinc and aluminum hydroxides from a strongly basic solution of zinc and aluminum salts. The combined precipitate is dried and on some occasions is calcined. The resulting product is a chemically combined oxide and/or hydroxide material of variable composition, which qualitatively reflects the proportions of zinc and aluminum in the solution from which the precipitate is formed. The zinc aluminates are generally of the formula $ZnO.Al_2(OH)_3$ or $ZnO.Al_2O_3$.

In a typical preparation, an aqueous mixture of zinc and aluminum salts, e.g., as the nitrates, is added to an aqueous solution rendered basic by the presence of ammonia, an ammonium salt such as ammonium carbonate, or sodium hydroxide. The resulting precipitate is recovered as by filtration and dried at a temperature above 100° C., e.g., from about 110° C. to about 120° C. It is useful on some occasions to complete the drying as by calcination at a higher temperature such as about 500° C. The proportions of zinc and aluminum in the zinc aluminate are qualitatively controlled by varying the relative concentrations of the zinc and aluminum ions in the solution from which the precipitate is formed. The zinc aluminate useful as stabilizer in the compositions of the invention suitably has a mole ratio of $ZnO:Al_2O_3$ of from about 1:0.25 to about 1:8. Zinc aluminates wherein the mole ratio of $ZnO:Al_2O_3$ is from about 1:0.5 to about 1:6.5 are preferred.

The mixture of hydroxyapatite and zinc aluminate is employed in a stabilizing quantity. The specific amount of stabilizing mixture present, and the relative proportions of the two components of the mixture, in the compositions of the invention is not critical, as long as a stabilizing quantity is present and other important polymer properties for the intended use are not adversely affected. The precise amount of each component required for melt stabilization will depend upon a variety of factors, such as the melt temperature, the polymer's LVN, and the interactive effects of other additives and impurities present.

The hydroxapatite is provided in an amount from less than about 0.01 wt % to 5 wt % or more hydroxyapatite, based on the weight of polymer to be stabilized. Compositions containing from less than about 0.01 wt % to about 1.0 wt % hydroxyapatite, on the same basis, are believed to exhibit desirable melt stability, while compositions containing less than about 0.01 wt % to about 0.5 wt % hydroxyapatite are preferred for a wide variety of uses.

The zinc aluminate is provided in an amount of from about 0.01 wt % to about 5 wt %, based on the weight of polymer to be stabilized. Compositions containing from about 0.05 wt % to about 0.5 wt % zinc aluminate on the same basis are preferred.

While not wishing to be bound by any particular theory, it is speculated that both the hydroxyapatite and the zinc aluminate may play a role in neutralizing the effect of impurities present in the polyketone polymer that cause a viscosity increase during the melt phase, and/or inhibit crystallization upon cooling. The combination of a hydroxyapatite and a zinc aluminate appears to provide a stabilizing mixture that is effective against both acidic and basic impurities. The types and amounts of impurities present may determine the optimum ratio of hydroxyapatite to zinc aluminate.

In general, a weight ratio of hydroxyapatite to zinc aluminate of from about 1:3 to about 3:1 provides acceptable results, with a weight ratio of from about 1:2 to 2:1 preferred, and a ratio of 1:1 most preferred.

The hydroxyapatite and zinc aluminate components of the stabilizing mixture are added to the polyketone polymer by any method suitable for forming an intimate mixture of the polymer and stabilizers. Such methods include dry blending of the polymer and stabilizers in a finely divided form, followed by hot pressing or extrusions of the mixture. The composition may also be produced by blending the components in a melt mixing device. The stabilizer components are preferably added to the polymer at the same time, but satisfactory results are obtained when the components are added separately.

The compositions of the invention may also include other additives such as antioxidants, dyes, fillers or reinforcing agents, fire resistant materials, mold release agents, colorants and other materials designed to improve the processability of the polymers or the properties of the resulting blend. Such additives are added prior to, together with, or subsequent to the blending of the polyketone and stabilizers. The presence of these additives may affect the optimum level of stabilizers for a given application.

The compositions are processed by methods such as extrusion and injection molding into sheets, films, plates and shaped parts. The compositions of the invention are particularly useful for the production of articles by multiple melting/crystallization cycles, and where elevated temperatures are likely to be encountered. Illustrative of such applications are the production of articles useful in both rigid and flexible packaging applications, such as containers and films, and in both internal and external parts for automotive use; fibers useful in yarns, tire cord, and fabric; and coatings for a variety of materials.

The invention is further illustrated by the following Examples which should not be regarded as limiting.

EXAMPLE 1

A linear alternating terpolymer of carbon monoxide, ethylene, and propylene (89/071) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.8 dl/g when measured in m-cresol at 60° C. The polyketone polymer also contained 0.5% Ethanox 330 and 0.5% Nucrel 535.

EXAMPLE 2

A zinc aluminate was produced by combining an aqueous solution of commercial grade zinc and aluminum nitrates with an aqueous solution of ammonium carbonate buffered to a pH of 7.5, and maintained at 50° C. The resulting precipitate was recovered by filtration, washed, dried at approximately 110° C., and calcined at 500° C. The resulting zinc aluminate had a mole ratio of 1:5.73 $ZnO:Al_2O_3$. Analysis of the zinc aluminate by plasma emission determined that the material contained 44 wt % aluminum, 9.3 wt % zinc, and 10 ppm sodium.

EXAMPLE 3

A portion of the polymer of Example 1 was ground to 60 mesh, and then powder-mixed with calcium hydroxyapatite (with a theoretical mole ratio of 1.67 Ca:P and/or the zinc aluminate of Example 2 in a Henschel mixer for 5 minutes. Samples containing various concentrations of calcium hydroxyapatite and/or zinc aluminate were prepared, as shown in Table 1. The samples were compounded in a 3/4 in. Braebender single screw extruder, operating at 60 to 100 rpm with melt temperatures between 230° and 250° C. The viscosity of each sample was determined over time in the melt in a Rheometrics parallel plate rheometer operated at 275° C. Table 1 lists the initial melt viscosity and the viscosity after 10 and 28 minutes. During commercial processing, polymers are typically in a melt phase for less than 10 minutes.

TABLE 1

| Calcium Hydroxyapatite (wt %) | Zinc Aluminate (wt %) | Viscosity (Pa.-sec.) | | |
|---|---|---|---|---|
| | | 0 min | 10 min | 28 min |
| 0 | 0 | 965 | 4820 | 12,500 |
| 0.25 | 0 | 965 | 3437 | 9,000 |
| 0.05 | 0.05 | 965 | 2833 | 8,876 |
| 0.10 | 0.05 | 965 | 3779 | 10,430 |
| 0.05 | 0.10 | 965 | 2781 | 8,361 |
| 0.10 | 0.10 | 965 | 2798 | 9,417 |

The results indicate that a combination of the two stabilizers is generally more effective than calcium hydroxyapatite added alone. Lower concentrations, particularly of calcium hydroxyapatite, appear more effective. The total wt % of the combined stabilizers is less than 0.25, indicating their effectiveness at low concentrations.

EXAMPLE 4

The polyketone terpolymer described in Example 1 and the samples described in Example 3 were evaluated in a differential scanning calorimeter (DSC). The tests were run with a Perkin-Elmer DSC, which employs sealed pan containers. The pan and contents were heated at a controlled rate, typically 20° C./min, until the sample melted. The pan and contents were then cooled until the sample solidified or partially crystallized. The samples were then heated to 275° C., maintained at that temperature for 10 minutes, and then cooled again. The holding temperature of 275° C. is typical for commercial melt processing operations. The first and second heats of crystallization ($HC_1$ and $HC_2$) of the samples were determined, in calories per gram, through use of the DSC.

In general, the heat of crystallization for a stabilized polymer will be greater than the corresponding value for an unstabilized polymer. However, the heat of crystallization for a stabilized polymer will decrease over repeated heating/cooling cycles. The heat of crystallization serves as an indication of the amount of crystallinity of the polymer. Degradation of the polymer during heating can inhibit crystallization upon cooling. The ratio of $HC_2$ to $HC_1$ for a given sample serves as a measure of the degree of crystallinity maintained over the two heating cycles. For a polymer exhibiting ideal melt stability (assuming no nucleating effects), this ratio is 1. The $HC_2/HC_1$ ratio for each sample is shown in Table 2.

TABLE 2

| Calcium Hydroxyapatite (wt %) | Zinc Aluminate (wt %) | $HC_2/HC_1$ |
| --- | --- | --- |
| 0 | 0 | .65 |
| 0.25 | 0 | .92 |
| 0.05 | 0.05 | .71 |
| 0.10 | 0.05 | .78 |
| 0.05 | 0.10 | .70 |
| 0.10 | 0.10 | .78 |

The $HC_2/HC_1$ ratios indicate that even small amounts calcium hydroxyapatite and zinc aluminate (0.05 wt % each) provided a significant increase in the amount of crystallinity maintained during a second heating/cooling cycle. Calcium hydroxyapatite alone (at 0.25 wt %) was even more effective to maintain crystallinity.

EXAMPLE 5

A portion of the polymer described in Example 1 was ground 60 mesh, and then tumbled overnight in nitrogen with calcium hydroxyapatite (with a theoretical mole ratio of 1.67 Ca:P) and/or the zinc aluminate of Example 2. The viscosity of each sample was determined over time in the melt in a Rheometrics parallel plate rheometer operated at 275° C. Table 3 lists the initial melt viscosity and the viscosity after 10 and 28 minutes.

TABLE 3

| Calcium Hydroxyapatite (wt %) | Zinc Aluminate (wt %) | Viscosity (Pa.-sec.) 0 min | 10 min | 28 min |
| --- | --- | --- | --- | --- |
| 0 | 0 | 965 | 8678 | 25,330 |
| 1.0 | 0 | 965 | 3681 | 10,570 |
| 0 | 0.1 | 965 | 5926 | 17,620 |
| 0 | 1.0 | 965 | 3036 | 9,532 |
| 0.5 | 0.5 | 965 | 3103 | 8,744 |

The results demonstrate that both calcium hydroxyapatite and zinc aluminate, when individually added to the polyketone polymer, can significantly mitigate the viscosity increase that would otherwise occur. A combination of the two stabilizers is even more effective than either one added individually.

What is claimed is:

1. A stabilized polymer composition comprising:
   a linear alternating polymer of carbon monoxide and at least one ethylenically unsaturated hydrocarbon; and
   a mixture of a hydroxyapatite and a zinc aluminate, wherein the mixture is present in the composition in a stabilizing amount.

2. The composition of claim 1 wherein the polymer is of the repeating formula

wherein G is a moiety of an ethylenically unsaturated hydrocarbon of at least 3 carbon atoms, polymerized through the ethylenic unsaturation, and the ratio of y:x is no more than about 0.5.

3. The composition of claim 2 wherein the hydroxyapatite is calcium hydroxyapatite.

4. The composition of claim 3 wherein the mole ratio of $ZnO:Al_2O_3$ is from about 1:0.25 to about 1:8.

5. The composition of claim 4 wherein is 0.

6. The composition of claim 4 wherein the ratio of y:x is from 0.01 to about 0.1.

7. The composition of claim 4 wherein G is a moiety of propylene.

8. The composition of claim 3 wherein the calcium hydroxyapatite is present in a quantity of from less than about 0.01 wt % to about 5 wt %, based on total composition, and the zinc aluminate is present in a quantity of from about 0.01 wt % to about 5 wt %, based on total composition.

9. A composition stabilized against a change in viscosity during melt processing which comprises a linear alternating polymer of carbon monoxide and at least one ethylenically unsaturated hydrocarbon having incorporated therein a stabilizing quantity of a mixture of hydroxyapatite and zinc aluminate.

10. The composition of claim 9 wherein the polymer is of the repeating formula

wherein G is a moiety of an ethylenically unsaturated hydrocarbon of at least 3 carbon atoms, polymerized through the ethylenic unsaturation, and the ratio of y:x is no more than about 0.5.

11. The composition of claim 10 wherein the hydroxyapatite is calcium hydroxyapatite.

12. The composition of claim 11 wherein the mole ratio of $ZnO:Al_2O_3$ is from about 1:0.25 to about 1:8.

13. The composition of claim 12 wherein y is 0.

14. The composition of claim 12 wherein the ratio of y:x is from 0.01 to about 0.1.

15. The composition of claim 12 wherein G is a moiety of propylene.

16. The composition of claim 11 wherein the calcium hydroxyapatite is present in a quantity of from less than about 0.01 wt % to about 5 wt %, based on total composition, and the zinc aluminate is present in a quantity of from about 0.01 wt % to about 5 wt %, based on total composition.

17. A method of stabilizing a linear alternating polymer of carbon monoxide and at least one ethylenically unsaturated hydrocarbon by incorporating therein a stabilizing mixture of a hydroxyapatite and a zinc aluminate.

18. The method of claim 17 wherein the polymer is of the repeating formula

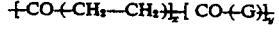

wherein G is a moiety of an ethylenically unsaturated hydrocarbon of at least 3 carbon atoms polymerized through the ethylenic unsaturation, and the ratio of y:x is no more than about 0.5.

19. The method of claim 18 wherein the hydroxyapatite is calcium hydroxyapatite.

20. The method of claim 19 wherein y is 0.

21. The method of claim 19 wherein the ratio of y:x is from about 0.01 to about 0.1.

22. The method of claim 19 wherein G is a moiety of propylene.

* * * * *